United States Patent [19]
Andrews

[11] Patent Number: 5,333,762
[45] Date of Patent: Aug. 2, 1994

[54] SCREW FEEDER WITH PROGRESSIVELY DECREASING SCREW CONFINEMENT

[75] Inventor: Robert L. Andrews, Plymouth, Mass.

[73] Assignee: Hyer Industries, Inc., Pembroke, Mass.

[21] Appl. No.: 60,198

[22] Filed: May 7, 1993

[51] Int. Cl.⁵ .............................................. G01F 11/20
[52] U.S. Cl. ................................ 222/238; 198/671; 222/413
[58] Field of Search ............... 222/412, 413, 236, 238, 222/241; 198/671, 533, 550.1, 662, 676

[56] References Cited

U.S. PATENT DOCUMENTS

| | | | |
|---|---|---|---|
| 428,346 | 5/1890 | Mueller | 222/413 |
| 710,879 | 10/1902 | Mitchell | 198/671 |
| 915,661 | 3/1909 | Covington | 222/413 |
| 1,880,840 | 10/1932 | Currier | 222/238 X |
| 2,311,726 | 2/1943 | Blue | 222/413 |
| 2,404,884 | 7/1946 | Pieper | 198/657 |
| 2,509,543 | 5/1950 | Truax | 222/241 X |
| 2,513,784 | 7/1950 | Blomquist | 198/64 |
| 2,563,318 | 8/1951 | Dodge | 198/657 |
| 3,019,025 | 1/1962 | Young | 275/8 |
| 3,258,165 | 6/1966 | Guyer | 222/238 X |
| 4,036,411 | 7/1977 | Westhoff | 222/413 |
| 4,057,225 | 11/1977 | Ferree | 222/413 X |
| 4,708,268 | 11/1987 | Wurtz | 222/413 X |

Primary Examiner—Kevin P. Shaver
Attorney, Agent, or Firm—Lahive & Cockfield

[57] ABSTRACT

A screw feeder for particulate solids comprises a trough section including a first chamber with a trough shaped side wall downwardly converging to a longitudinally tapered aperture. A screw chamber encloses a space below and connecting with the aperture. The screw chamber houses a feed screw which enters a feeder section in a transition region at the front wall of the agitator chamber. An agitator draws material away from the transition region of the agitator chamber.

12 Claims, 6 Drawing Sheets

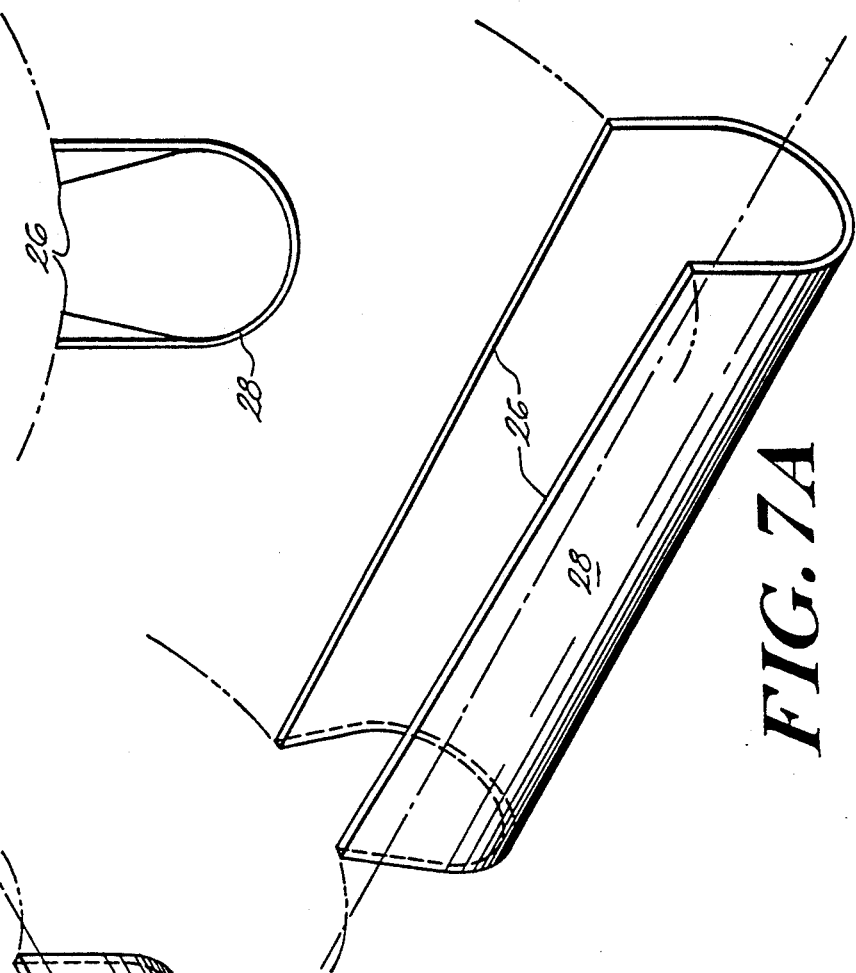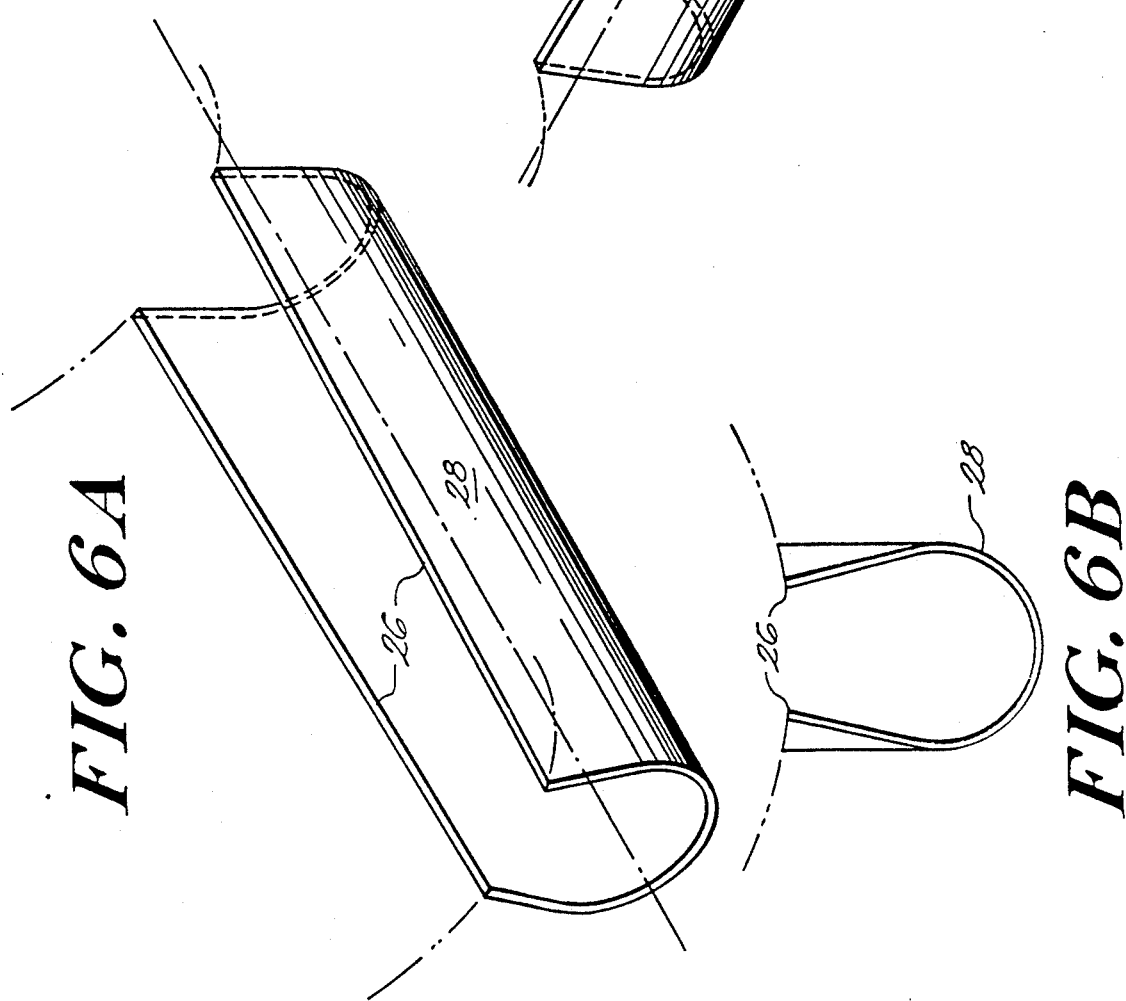

SCREW FEEDER WITH PROGRESSIVELY DECREASING SCREW CONFINEMENT

SUMMARY OF THE INVENTION

This invention relates generally to screw feeders used to meter particulate solids such as powders, granules and the like at a controlled volume or mass rate of flow. More particularly, the invention concerns screw feeders for materials having cohesive and other properties that tend to cause erratic feed and stalling of the feeder due to compaction and other conditions.

It is well recognized that a helical feed screw within a confining cylinder having minimal clearance between the screw flights and the cylinder wall, if properly loaded with particulate solids in a uniform state, is capable of delivering the solids at an accurately controlled rate for any desired purpose such as a downstream industrial or loading process. An essential requirement for such a feeder is a means for loading the screw so that the flights are uniformly filled.

It is also known that when a helical screw is supported within a trough or similar container for particulate solids such as granular or powder material, where the walls of the container are remote from the screw flights, rotation of the screw tends to convey the material along its length under certain conditions. This action results from axial and radial thrust forces of the screw upon the material. If there were no appreciable radial reaction forces the rotation of the screw would cause material contacting the flights to be moved radially, and the screw would not convey appreciable amounts of material longitudinally. However, since particulate solid material within the container produces a head pressure at the screw, radial reaction forces are developed, tending to confine the material and resist radial movement from within the flight diameter. To a corresponding extent the material, which is also subjected to longitudinal forces by the screw, is conveyed longitudinally. Since the material confinement is not complete, some material flows radially or with a radial component, and impinges on the material adjacent and surrounding the screw. The effect of this upon such adjacent material is dependent upon its cohesive properties. In a practical embodiment the rotation of the screw longitudinally conveys material which is outside and adjacent as well as within the flight diameter.

In general terms, relatively little energy is required to convey material by means of an unconfined screw, as compared with a screw closely confined within a cylinder as previously described, since there is no friction developed along a confining cylinder wall. However, the rate of longitudinal feed is typically head pressure dependent, uneven and therefore unsuitable for accurately metered delivery rates.

With the above considerations in view, combined structures are in general use, comprising a trough section downwardly tapering toward a feed screw at or near the base or throat and open at the top to receive the particulate material, the trough section being attached to a feeder section comprising a cylinder into which the feed screw projects with minimal clearance. The trough section is intended to cause the flights to be filled with material at the connection or transition region where the feeder section is attached to the trough section, thus permitting the feeder section to deliver the material at a precisely controlled rate.

Prior designs of such a combined structure have encountered a number of difficulties resulting in erratic feed, binding and, in extreme cases, stalling of the feed screw, and also nonuniform material feed within the trough section. The problems are more extreme with certain cohesive powders, for example titanium dioxide powder, and colloidal silica prepared in a hot gaseous environment as sold under the trademark Cabosil. Bridging or arching may occur over the screw flights, and the material may flow in only certain portions of the trough section, causing accumulation and compaction of material in "dead" or non-moving regions. Thus a "heel" or reserve of material may be created in the trough section, which will not flow during routine operation but only as the apparatus is being emptied.

Compaction of material in the trough section often presents acute problems in the transition region where the feed screw enters the feeder section, as a result of the longitudinal movement of material adjacent the screw flight diameter. This moving material is obstructed by the front wall of the trough section and becomes compacted, forming a body of accumulating, non-moving material adjacent the screw. Such material is capable of eventually compacting the adjacent material within the flight diameter, and interfering with and arresting the motion of the screw. Such conditions typically require the equipment to be periodically shut down and the trough and feeder sections disassembled and cleaned.

An object of the present invention is to eliminate the above-described material flow problems, including the accumulation of compacted material in the trough section and nonuniform and erratic feed patterns.

Another object is to provide means for mechanically relieving the tendency of material adjacent the feed screw to impact the front wall of the trough section and thereby to cause compaction in the transition region.

Another object is to provide apparatus adapted to condition the particulate material in the trough section, whereby it will have uniform qualities and uniformly fills the flights of the screw before entering the feeder section.

Another object is to provide improvements enabling the accurate metering of difficult, cohesive powders and the like for use in industrial processes.

Another object is to provide apparatus adapted for use with a plurality of interchangeable feed screws in order to achieve a number of different material flow rates. Such feed screws are preferably of differing diameters and/or pitch, allowing materials having differing flow properties to be interchangeably processed with the same equipment.

Another object is to provide apparatus requiring less frequent cleaning than prior designs, and being adapted for rapid disassembly and easy cleaning when desired.

With the foregoing and other objects hereinafter appearing in view, the features of this invention include a trough section comprising an agitator chamber and a screw or conveyor chamber. The agitator chamber converges downwardly to a lengthwise tapered aperture, the width of the aperture progressively increasing from the back wall of this chamber toward the front wall. The feed screw passes through the screw chamber which encloses a space below this aperture and connecting therewith. Thus the screw chamber confines the feed screw to a partial extent at the back wall, the degree of confinement being progressively reduced in the longitudinal direction toward the front wall. As a result, moving material in the screw chamber adjacent the feed screw is relieved from the transition region, and the agitator moves the material toward the center of the agitator chamber.

According to another feature, means are provided for mechanically sweeping the agitator chamber space and drawing material adjacent the feed screw away from the transition region, that is, the region where the feed screw enters the feeder section.

According to another feature, the agitator chamber may be provided with an agitator adapted to draw material away from the transition region and also to agitate and condition the material within a larger region of the chamber, promoting mass flow wherein substantially all of the material within the agitator chamber is in motion when the feed screw is rotating. The agitator uniformly conditions the material, enabling it to fill the screw fully and uniformly.

Other features of the invention reside in certain structures and modes of operation that may be more clearly understood with reference to the following description, having reference to the appended drawings.

DESCRIPTION OF THE DRAWINGS

FIG. 6a is an oblique view from the back wall of the screw or conveyor chamber.

FIG. 6b is an elevation in transverse section of the screw chamber at the back wall of the trough section.

FIG. 7a is an oblique view from the front wall of the screw or conveyor section.

FIG. 7b is an elevation in transverse section of the screw chamber at the front wall of the trough section.

DETAILED DESCRIPTION

Figure 8:
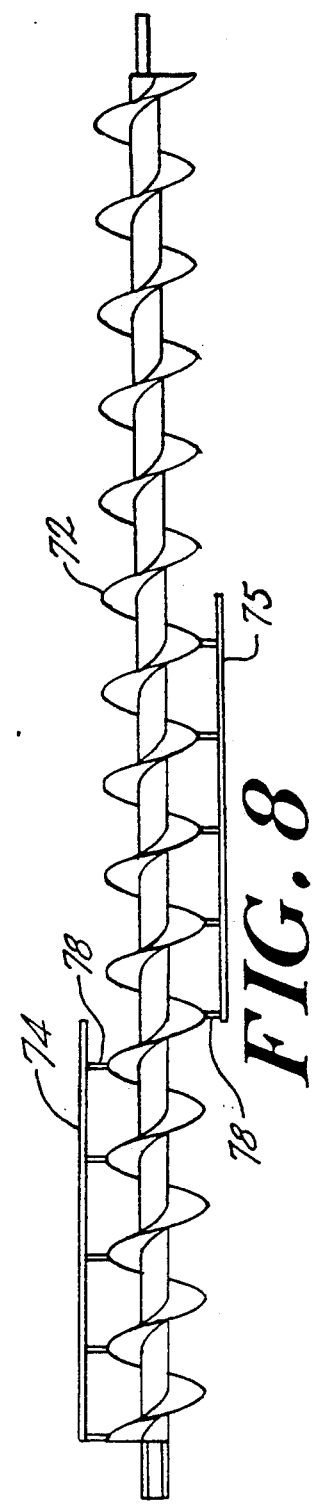
FIG. 8 shows a first alternative embodiment of an interchangeable feed screw.

Referring to the drawings, FIGS. 1 to 7 show the presently preferred embodiment of the invention as employed with an interchangeable, maximum diameter feed screw, which may be replaced by one or more feed screws of progressively smaller diameters as hereinafter described in connection with FIGS. 8 and 9. The screw feeder, depicted generally at 12, comprises a trough section 14 and a feeder section 16. The trough section comprises an agitator chamber 18 and a screw or conveyor chamber 20. The agitator chamber is formed by an elongate trough shaped side wall 22 downwardly curved toward the horizontal and preferably permanently attached to a back wall 24 of rectangular dimensions and forming a closure for one end thereof. The side wall 22 converges downwardly to a lengthwise tapered aperture 26, the width of the aperture progressively increasing in the direction away from the back wall 24.

The screw or conveyor chamber 20 is formed by a member 28 having a lower portion conforming to a half cylinder and an upper portion opening progressively and connecting with the side wall 22 to form the aperture 26. The screw chamber has a U-shaped cross section at its front end opposite the back wall 24.

An end plate 30 preferably has rectangular outer dimensions corresponding to those of the back wall 24 and a formed inner edge shaped to fit with the edges of the side wall 22 and the member 28, being permanently attached to said edges.

The feeder section 16 comprises a cylinder 32 attached by welding or bolting to a front wall 34. When assembled on the trough section, the cylinder 32 is coaxial with the half cylindrical shape of the screw chamber 20. The front wall completes the end enclosure of the agitator and screw chambers. The feeder section is mounted on the trough section by a pair of pins 36 attached to and projecting from the plate 30 and passing through matching holes in the wall 34. The wall 34 is firmly held against the plate 30 by a locking bar 38 swiveled on a hinge pin 40 attached to the plate 30. In use, the locking bar is pivoted against the front wall 34 and fastened by a suitable latch 42 to a pin 44 attached to the plate.

A feed screw 46 is of uniform cross sectional dimensions along its length and comprises a shaft 48 and helical flights 50 of uniform pitch and outer diameter extending from the back wall 24, through the front wall 34 and into and through the cylinder 32 to its delivery end formed by a short cylindrical connecting section 52. The flights of the screw fit the inner diameter of the cylinder 32 with minimum clearance, thus providing maximum precision of metering of the particulate material.

Adjacent the back wall 24 the screw flights are effectively confined over a portion of the circumference substantially exceeding 180°, and such confined portion decreases progressively in the longitudinal direction of the screw to 180° at the front wall 34.

Thus the feeder section comprises a quickly detachable subassembly including the cylinder 32, the front wall 34 and the screw 46. When assembled to the trough section a hexagonal end of the screw shaft 48 fits within a drive socket on a motor and transmission unit 54 mounted externally on the back wall 24.

The back wall 24 rigidly supports a stub shaft 56 projecting inwardly into the agitator chamber 18 and outwardly to a motor and transmission unit 58. The rotational speeds of the units 54 and 58 are preferably independently adjustable. An agitator 60 comprises a pair of helical shaped blades 62 and 64 supported by a sleeve 66 keyed to and rotatable with the shaft 56 and a plurality of spokes 68 and 70, respectively, attached to and projecting from the sleeve 66. Each of the blades 62 and 64 extends approximately half the longitudinal extent of the agitator chamber, and they are of opposite hand or winding sense, whereby during rotation, the blade 62 moves material away from the front wall 34 toward the center of the agitator chamber and the blade 64 moves material from the back wall 24 toward the center of the agitator chamber. Preferably, the blades 62 and 64 extend radially from the sleeve 66 as close as practicable to the tapered aperture 26.

In operation, particulate solids such as powders or granular material are loaded into the top of the agitator section. Loading is continuous or repeated, typically from a hopper provided with a discharge gate, to keep the agitator chamber 18 substantially filled as the material in this chamber is depleted by action of the feed screw 46. The agitator 60 and the feed screw are preferably independently driven, and means are provided for varying their relative speeds. The agitator rotates and conditions the material in the space 18, breaking any arches or bridging that may tend to form over the flights of the feed screw, thus facilitating flow of the material into the screw chamber 20 through the tapered aperture 26. In the region at the back wall 24 where the screw flights are substantially confined by the member 28, the material fills the space within the flight diameter and is efficiently conveyed longitudinally, with little of such material being forced radially therefrom by reason of the confinement by the member 28. The confinement provided by this member decreases progressively toward the front wall 34, thus providing a substantially wider opening upwardly into the space 18 in the transition region at the front wall 34. By this means the agitator blade 62 is effective to entrain material adjacent and outside the flight diameter of the screw at its upper region, forcing such material toward the center of the agitator chamber. In a similar manner the agitator blade 64 moves material surrounding the upper region of the feed screw from the back wall 24 toward the center of the agitator chamber.

The foregoing action effectively prevents the accumulation of material in any region of the agitator or screw chambers, since these chambers are substantially totally swept by the agitator blades and screw flights. Compaction of material on the front wall 34 is obviated by the mechanical action of the agitator, facilitated by the relatively open communication between the screw and agitator chambers near the front wall. The tapering of the aperture 26 provides an effective compromise between the desirable containment of the feed screw in the region nearer the back wall and the need for greater communication between the feed screw and the space 18 within the agitator chamber near the transition region at the front wall 34 adjacent the screw.

As above described, the screw feeder 12 is adapted to accommodate a feed screw 46 of a maximum flight diameter. For certain particular materials and different rates of feeding, it may be desirable to employ feed screws of one or more smaller flight diameters, and the same or different pitches. For this reason it is preferred to provide for easy detachment of the feeder section 16 from the trough section 14. A plurality of feeder sections can then be employed interchangeably with the same trough section. Preferably, each such feeder section has a front wall 34 of identical construction attached to a cylinder such as the cylinder 32, these cylinders being of different diameters. Each feeder section also includes a feed screw having minimum clearance within its respective cylinder.

It is apparent that when these feed screws of smaller diameter are employed, there is a greater clearance space between the flights and the member 28 forming the screw chamber 20. FIGS. 8 and 9 illustrate two alternative forms of screw construction adapted to permit this clearance space to be swept by rotation of the screw. In FIG. 8 a screw 72 has a pair of diametrically opposite sweep bars 74 and 75 each attached by struts 78 to the periphery of the screw flights and extending parallel to the screw axis. The bars 74 and 75 preferably have minimal clearance with the wall of the member 28.

Figure 1:
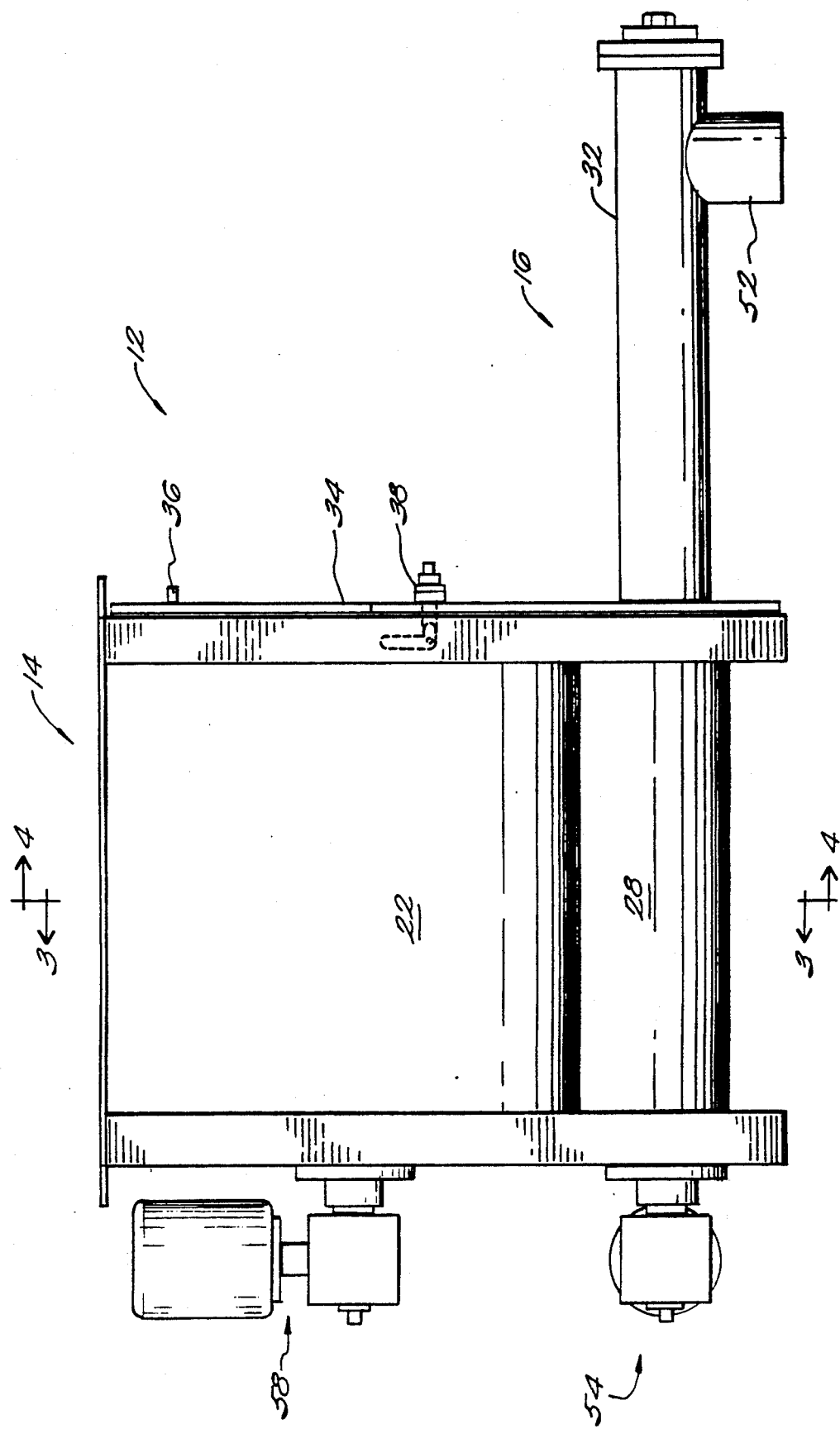
FIG. 1 is a side elevation of the presently preferred embodiment of a screw feeder according to this invention.
Figure 2:
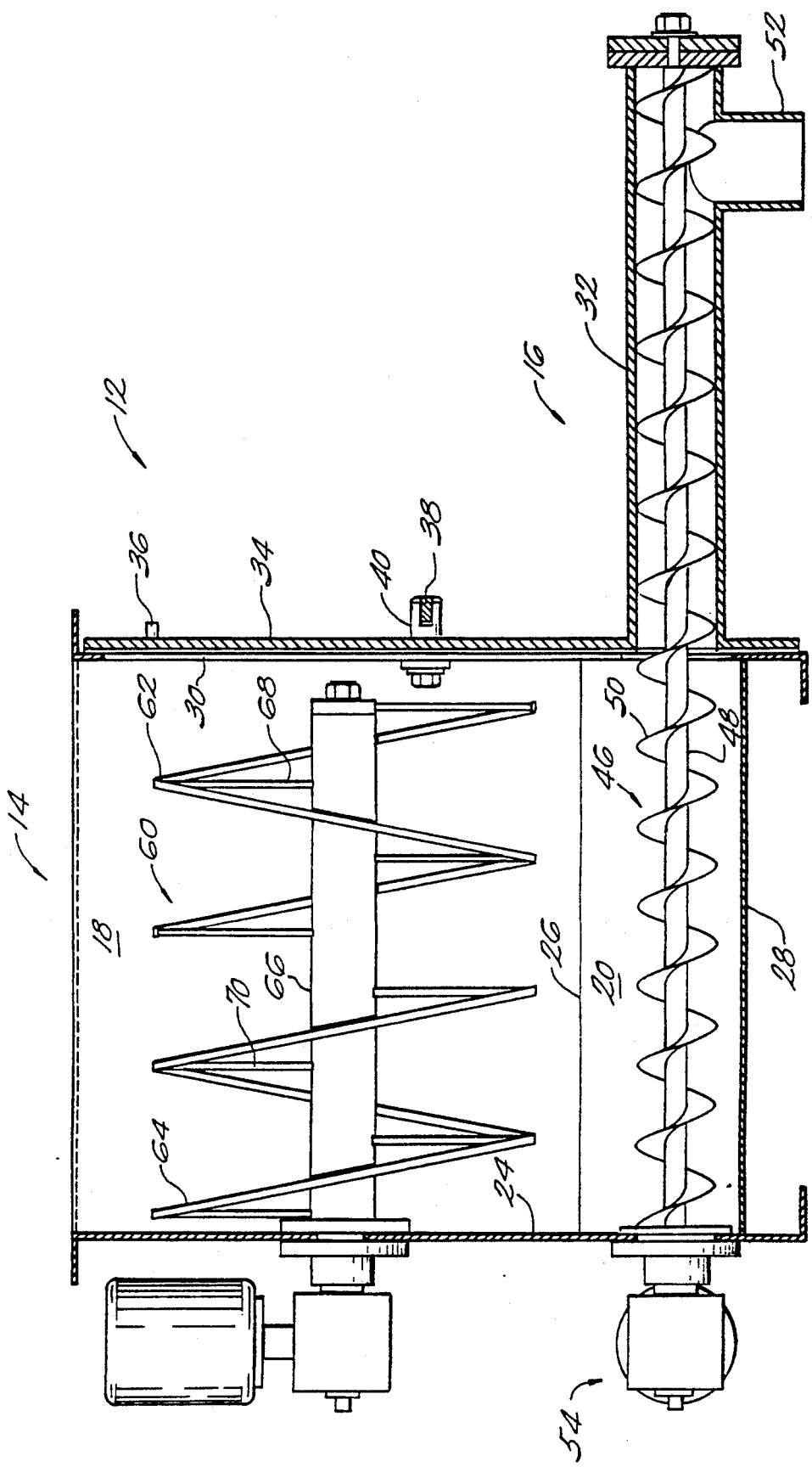
FIG. 2 is a side elevation in section of the embodiment of FIG. 1 on the plane containing the axis of the feed screw.
Figure 4:
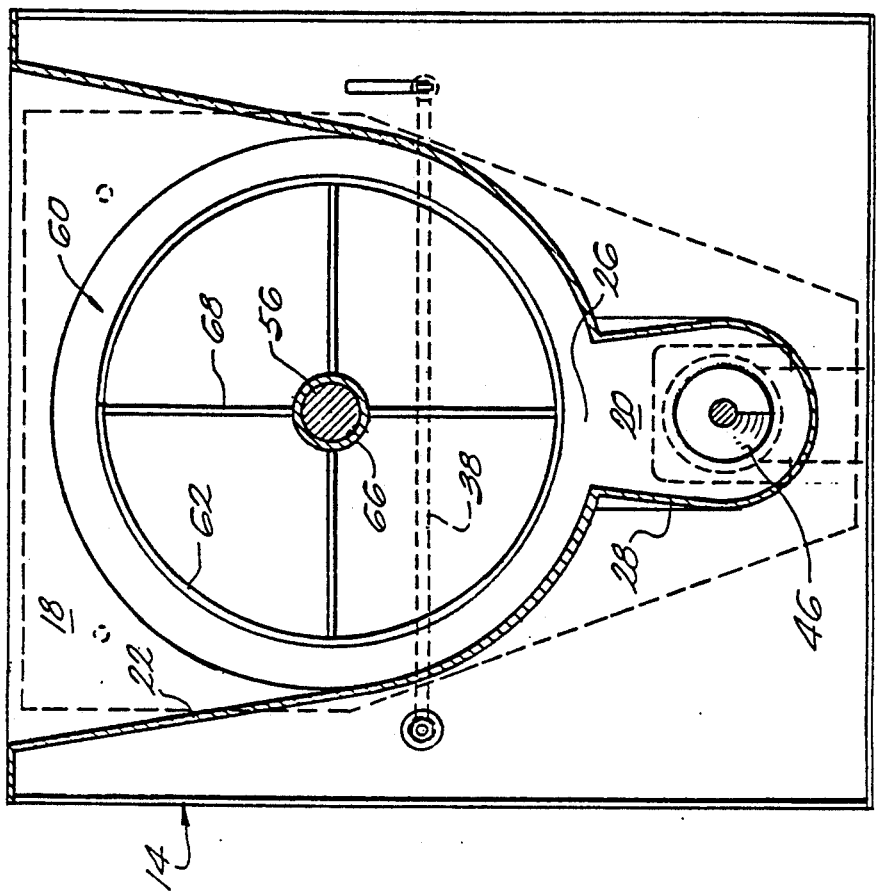
FIG. 4 is an elevation in section taken on line 4—4 in FIG. 1.
Figure 3:
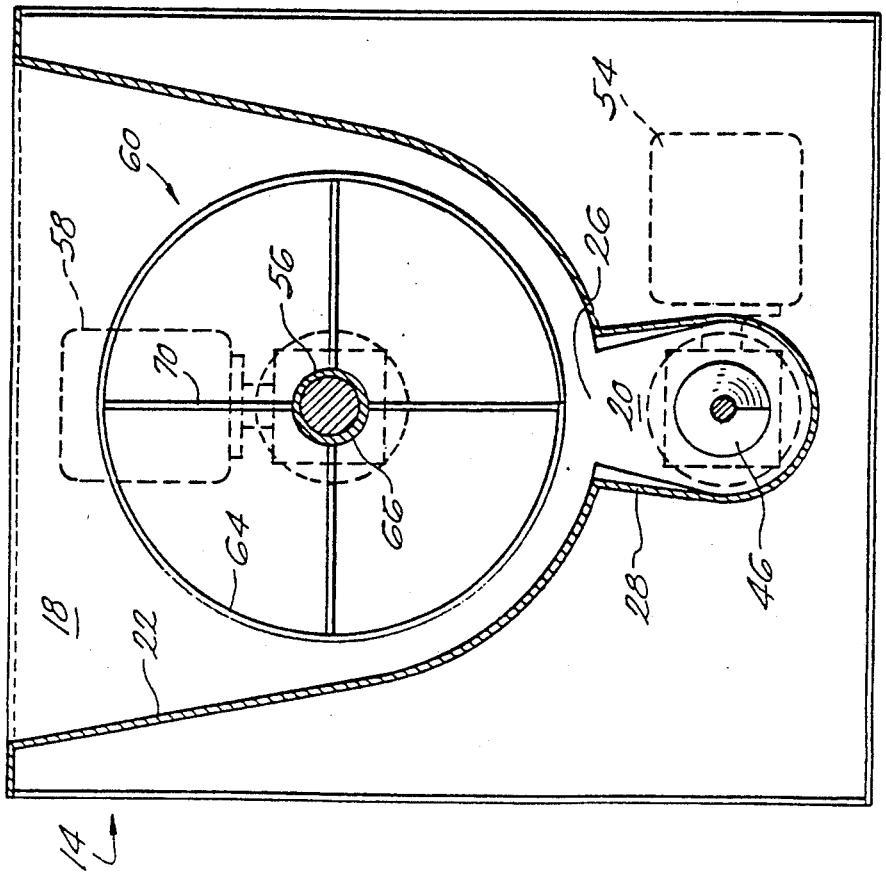
FIG. 3 is an elevation in section taken on line 3—3 in FIG. 1.
Figure 5:
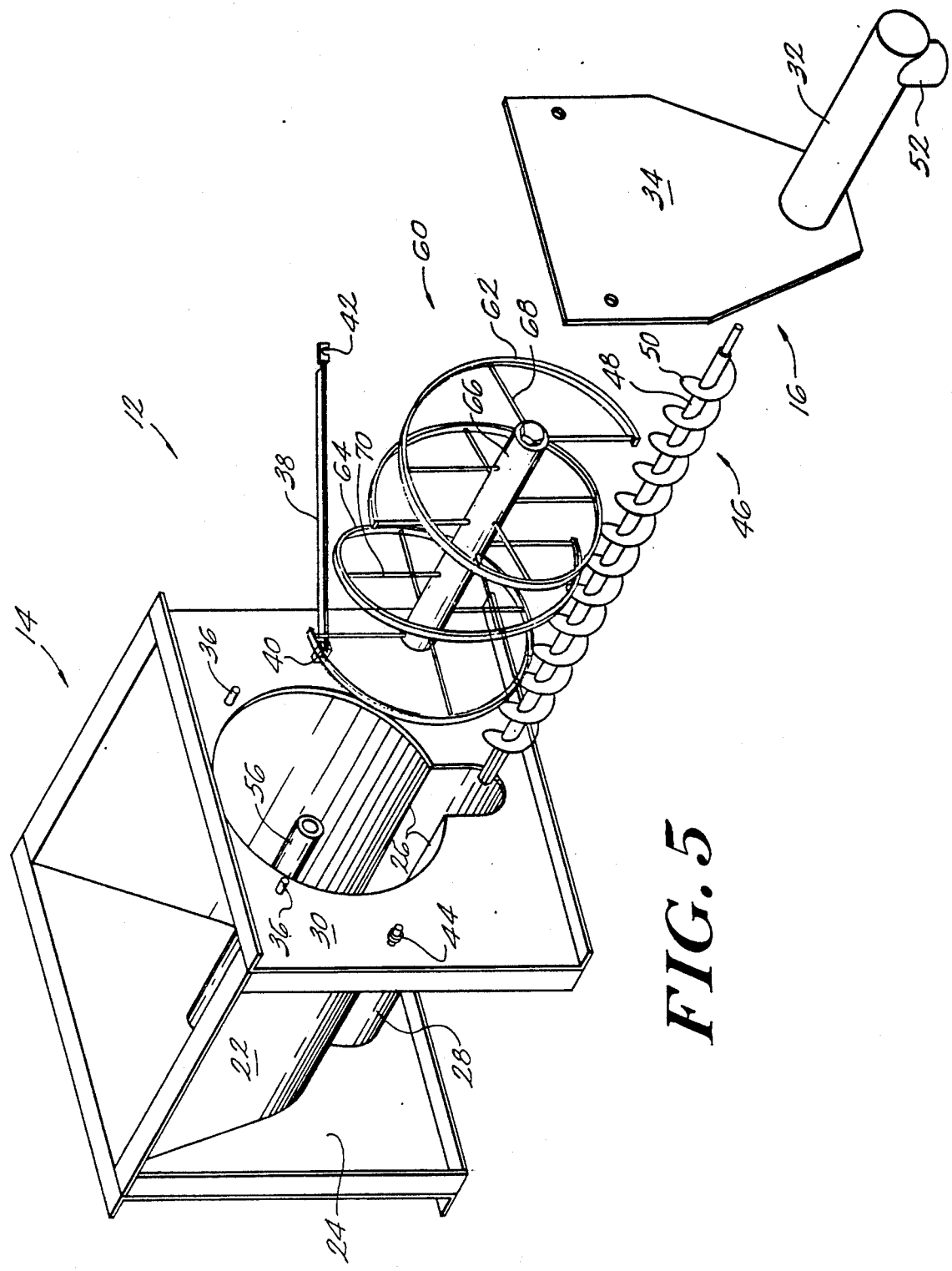
FIG. 5 is an exploded view of the feeder of FIG. 1.
Figure 9:
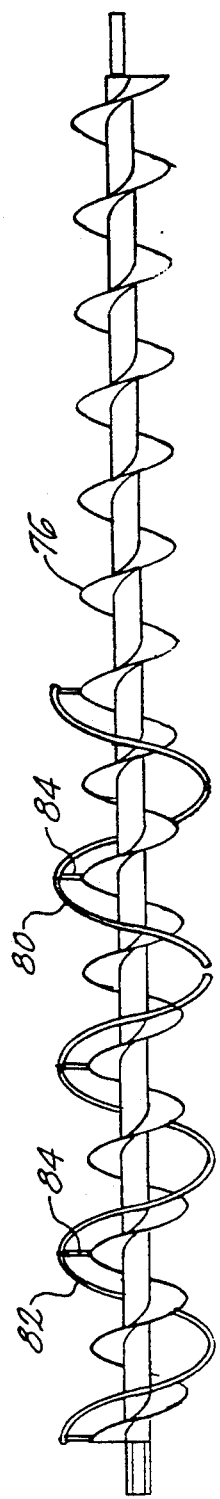
FIG. 9 shows a second alternative embodiment of an interchangeable feed screw.

In FIG. 9 a screw 76 is provided with a pair of helical overwinding blades 80 and 82 extending in the screw chamber 20 and each supported on struts 84 attached to the periphery of the screw flights. The winding sense of the blade 82 is the same as that of the screw 76. The longitudinal dimension of the blade 80 is substantially shorter than that of the blade 82, and the winding sense of the blade 80 is opposite to that of the screw 76. Each of the blades 80 and 82 has a substantially longer pitch than that of the screw 76. Preferably, the blades 80 and 82 extend from the back wall 24 to a point intermediate between the back wall and the front wall 34.

I claim:

1. A screw feeder for particulate solids having, in combination,
   a trough section comprising a first chamber having front and back walls and an elongate trough shaped side wall open at the top, closed at its ends by the front and back walls and converging downwardly to a lengthwise tapered aperture, the width of said aperture progressively increasing from the back wall toward the front wall,
   a screw chamber having a member enclosing a space below said aperture, said member having a lower portion substantially conforming to a half cylinder and an upper portion opening progressively from the back wall toward the front wall and terminating at said tapered aperture,
   a feeder section comprising full cylinder having an end attached to and communicating through the front wall coaxially with said half cylinder,
   a feed screw having helical flights and extending coaxially through the screw chamber and feeder sections,
   said member confining the circumference of the screw flights adjacent the back wall over a portion of the circumference substantially exceeding 180 degrees, such confined portion decreasing progressively in the longitudinal direction of the screw, and means to rotate the feed screw.

2. A screw feeder according to claim 1, in which the flights of the feed screw are of uniform pitch and diameter.

3. A screw feeder according to claim 2, in which the full and half cylinders are of substantially the same inner diameters.

4. A screw feeder according to claim 2, in which the half cylinder has a larger diameter than the full cylinder and the portion of the feed screw therein has a longitudinal extension attached thereto and extending radially therefrom.

5. A screw feeder according to claim 4, in which the extension includes at least one elongate bar extending substantially parallel to the feed screw axis.

6. A screw feeder according to claim 4, in which the extension includes a helical blade pitched in the same sense as that of the feed screw.

7. A screw feeder according to claim 4, in which the extension comprises a first helical blade adjacent the front wall and pitched in the sense opposite to that of the feed screw, and a second helical blade adjacent the back wall and pitched in the same sense as the feed screw.

8. A screw feeder according to claim 1, including an agitator rotatably supported in the first chamber, extending longitudinally thereof and adapted to draw solids adjacent the front wall toward the back wall, and means to rotate the agitator.

9. A screw feeder according to claim 8, in which the agitator comprises a helical blade.

10. A screw feeder according to claim 8, in which the agitator comprises a helical blade rotated to draw solids adjacent the front wall in the direction toward the back wall.

11. A screw feeder according to claim 8, in which the agitator comprises a first helical blade adjacent the front wall and rotated to draw solids adjacent the front wall in the direction toward the back wall, and a second helical blade adjacent the back wall and rotated to draw solids adjacent the back wall in the direction toward the front wall.

12. A screw feeder according to claim 8, in which the rotational speeds of the means to rotate the feed screw and the means to rotate the agitator are independently adjustable.

* * * * *